June 7, 1960 — R. C. BUSH — 2,939,438
ROTARY INTERNAL COMBUSTION CHAMBER
Filed Nov. 12, 1957 — 2 Sheets-Sheet 1

INVENTOR
RAYMOND C. BUSH
BY Gustave Miller
ATTORNEY

June 7, 1960  R. C. BUSH  2,939,438
ROTARY INTERNAL COMBUSTION CHAMBER
Filed Nov. 12, 1957  2 Sheets-Sheet 2

INVENTOR
RAYMOND C. BUSH
BY Gustave Miller
ATTORNEY

United States Patent Office 2,939,438
Patented June 7, 1960

2,939,438

ROTARY INTERNAL COMBUSTION CHAMBER

Raymond C. Bush, Warrenton, Oreg., assignor of one-tenth to Amanda Cherry, Medford, Oreg., of one-eighth to T. R. Flury, Eagle Point, Oreg., and of one-eighth to J. J. Breeze, Medford, Oreg.

Filed Nov. 12, 1957, Ser. No. 695,711

1 Claim. (Cl. 123—14)

This invention relates to a rotary internal combustion engine, and it particularly relates to an improved type of rotary engine of high efficiency relative to its size and weight.

Heretofore, rotary internal combustion engines have all been relatively complex, generally requiring two sets of coaxially-arranged cylinder housings wherein one cylinder housing contained the compression assembly and the other contained the power assembly. Complicated and delicately-balanced transfer means were required to provide split-second transfer of the fuel mixture from one assembly to the other. Furthermore, the various passages and valves required in these prior engines tended to clog easily and any such clogged passage or valve disrupted the entire operation of the engine. This problem was made the more apparent by the difficulty involved in locating the clogged area. The problem of friction wear and proper lubrication of the parts always was a major factor to be contended wtih. In addition, these prior engines were usually liquid-cooled, thereby greatly adding to the total weight and bulk of the engine.

It is one object of the present invention to overcome the above as well as other disadvantages of the prior types of rotary engines by providing an engine which is highly effective although relatively light in weight and simple in construction.

Another object of the present invention is to provide a rotary engine wherein the presence of movable valving is kept to a minimum.

Another object of the present invention is to provide a rotary engine wherein frictional wear is kept to a minimum and wherein the parts are effectively lubricated.

Another object of the present invention is to provide a rotary engine wherein the consumption of fuel is relatively low compared with the power obtained.

Other objects of the present invention are to provide an improved rotary engine, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which.

Figures 1, 2:
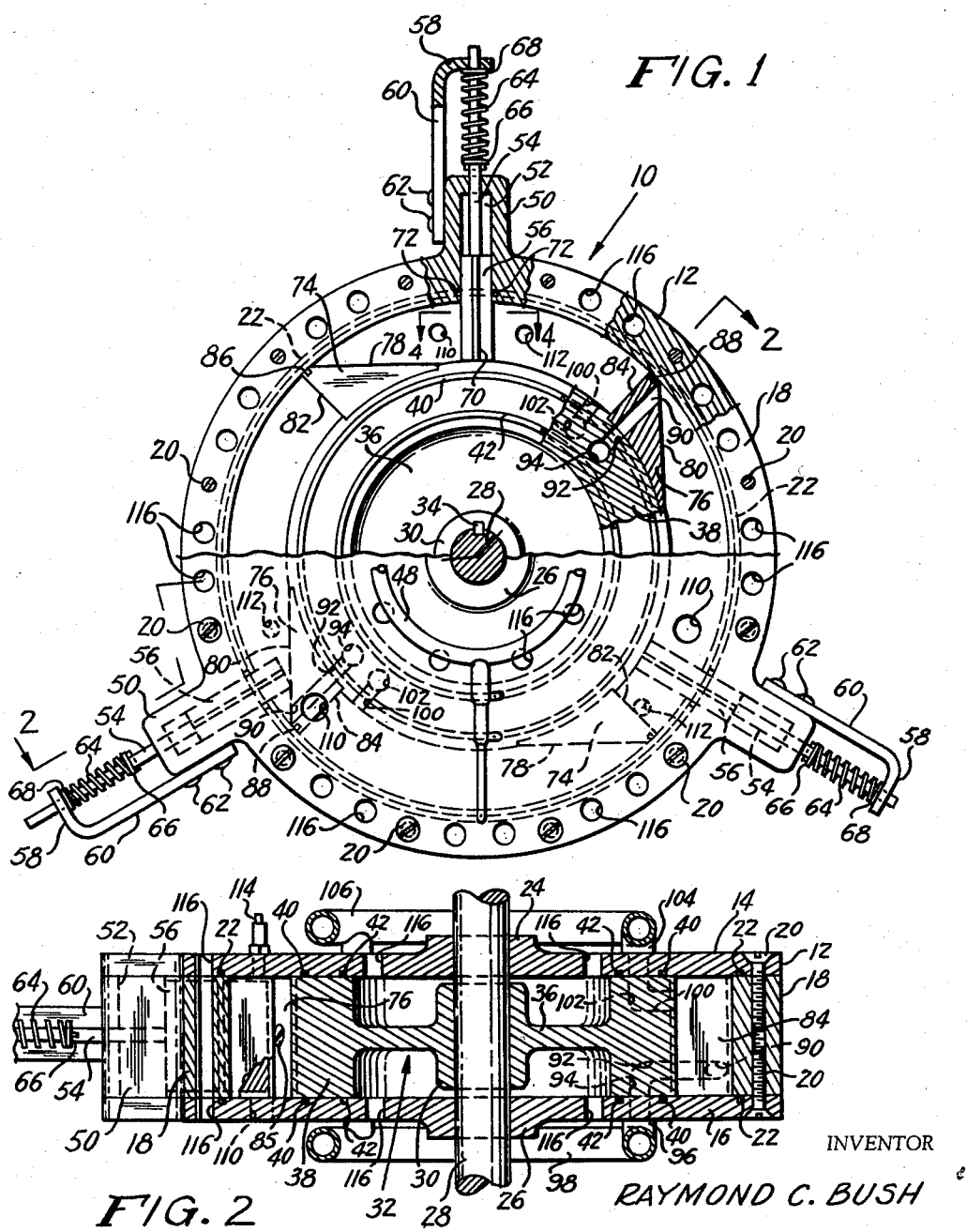
Fig. 1 is a side view, partly in elevation and partly in section of a rotary engine embodying the present invention.
Fig. 2 is a sectional view taken on line 2—2 of Fig. 1.

Referring now in greater detail to the drawings wherein similar reference characters refer to similar parts, there is shown a rotary engine, generally designated 10, which comprises a cylindrical housing 12 consisting of a pair of circular plates 14 and 16 representing respectively the front and rear plates of the housing. These plates 14 and 16 are spaced from each other by an annular spacer ring 18 on the outer periphery of the housing 12. Screws 20, of the countersunk type, extend into the spacer 18 from front and rear to hold the plates 14 and 16 to the spacer. These screws 20 are distributed evenly around the housing, as best illustrated in Fig. 1. Adjacent the inner edge of the spacer 18 is provided, on either side thereof, a sealing ring or gasket 22 positioned within an annular recess in the internal surfaces of the plates 14 and 16 respectively.

At the center of each plate 14 and 16 is provided a bearing portion, as at 24 and 26 respectively, and extending through these bearing portions 24 and 26 is the drive shaft 28. Keyed to the shaft 28, within the housing 12, is the surounding hub 30 of a rotor 32; the hub 30 being keyed to the shaft 28 by a key 34.

Figure 6:
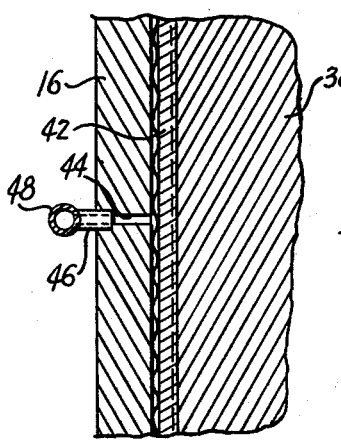
Fig. 6 is a fragmentary sectional view taken on line 6—6 of Fig. 5.

The rotor 32 comprises, in addition to the hub 30, a web portion 36 of reduced thickness at the outer end of which is provided an enlarged, ring portion 38, the width of which is substantially equal to the inner diameter of the housing 12 with just sufficient clearance to permit relative rotation. On the inner surface of the housing 12, more specifically on the inner surfaces of plates 14 and 16 adjacent the ring portion 38, are provided two annular recesses, one adjacent each edge of the ring portion 38, and in each annular recess is positioned a sealing ring or gasket as indicated at 40 and 42, best shown in Fig. 2. Each of the sealing rings 40 and 42, as well as the sealing ring 22, are provided with a space in the rear thereof within their respective recesses. This space is provided with an inlet port, such as illustrated at 44 in Fig. 6, which is in communication, through a fitting 46 and a pipe 48, with a source of lubricating oil, not shown. This lubricating oil behind the sealing rings not only places a positive pressure on the rings so as to increase the effectiveness of the seal, but also provides for a certain amount of seepage past the rings. This seepage of oil acts as an effective, ever-present, lubricating means to prevent undue frictional wear.

Equidistantly spaced around the periphery of the housing 12 are three radially-extending bosses 50. These bosses 50 are hollow to provide an inner recess 52. This recess 52 extends through the ring spacer 18 to provide communication with the interior of the housing 12. At the top or outer end of each boss 50 is provided a narrow passage in communication with the recess 52. A rod 54 extends through this passage and into the recess 52 where it is connected to the upper end of a plate 56. At its opposite end, the rod 54 is slidably engaged in an opening in the flange 58 of a bracket 60 attached to the exterior of the boss 50 by rivets, bolts or the like such as indicated at 62.

The rod 54 is surrounded by a coil spring 64 positioned between a follower 66 at the inner end and a washer 68 adjacent the flange 58. The spring 64 is attached to the rod 54 and acts to bias the rod 54 radially inward; whereby the plate 56 is biased toward contact with the ring portion 38 of the rotor 32.

The plate 56 is of generally rectangular configuration and is provided with a longitudinal slot along each edge mating with a slot along the bottom edge. In these slots are positioned sealing strips 70, yieldably urged into the slots by the springs 71, similar to the sealing rings 22, 40 and 42. Sealing strips 72 are also provided in corresponding recesses in the ring spacer 18 on either side of the plate 56. Preferably, an oil conduit is also provided behind each strip 72 to provide positive sealing as well as lubrication through leakage.

The plates 56 form what may be called slidable valves, or abutments, or piston heads; and they coact with the pistons circumferentially connected to the ring portion 38 of the rotor 32 to provide the power strokes in the engine.

Figure 3:
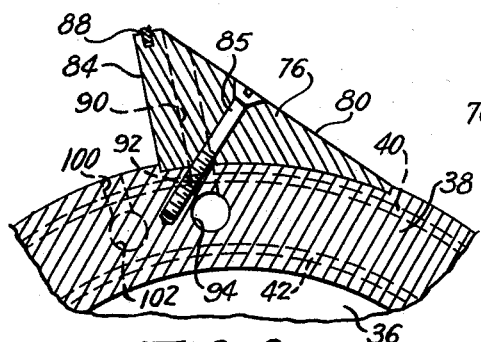
Fig. 3 is an enlarged, detailed, sectional view of one of the pistons.
Figure 4:
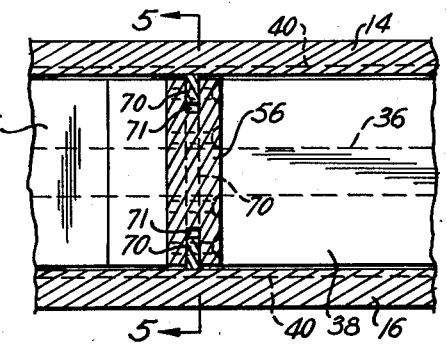
Fig. 4 is a sectional view taken on line 4—4 of Fig. 1.
Figure 5:
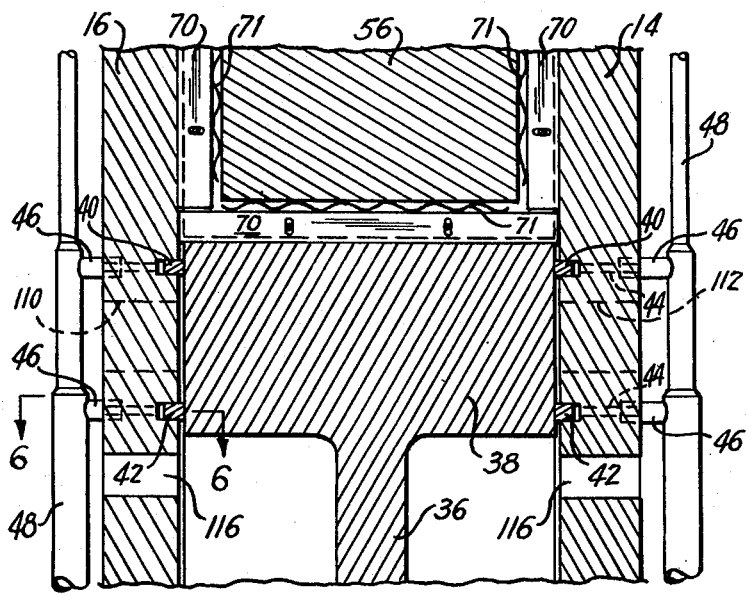
Fig. 5 is a sectional view taken on line 5—5 of Fig. 4.

The pistons connected to the outer periphery of ring portion 38 comprise two sets of pistons, to wit, pistons 74 and 76. The pistons 74 and 76 are substantially alike, comprising a forward, gradually-inclined edge, as at 78 and 80, and an abrupt, straight edge at the rear, as at 82 and 84. The pistons 74 and 76 are both attached to the ring portion 38 by countersunk screws or the like, such as shown at 85 in Fig. 3. The apex between the inclined forward portion and rear straight portion of each piston is only slightly spaced from the inner surface of spacer ring 18 and is provided with a sealing strip, such as indicated at 86 and 88 respectively, which bear against the inner surface of the spacer ring 18 as the rotor rotates.

The pistons 74 differ from the pistons 76 in that while the pistons 74 are solid, the pistons 76 are each provided with a radial passage 90 adjacent to and generally parallel with the rear edge 84. This passage 90 extends clear through the piston 76 and connects with a similar passage 92 in the ring portion 38 of the rotor 32. The passage 92, in turn, connects with a lateral passage 94 leading through the rear plate 16 of the housing 12. A pipe 96 connects the passage 94 to an exhaust manifold 98 adjacent the outer surface of the rear plate 16. The exhaust manifold 98 is connected to an exhaust system, not shown.

Behind each piston 76, the ring portion 38 of the rotor 32 is provided with an additional passage 100 which opens onto the outer face of the ring portion 38. This passage 100 is connected to a lateral passage 102 which extends through the front plate 14 of the housing 12 and which is connected to a pipe 104 leading to a supply manifold 106 adjacent the front plate 14. The manifold 106 is connected to the carburator, not shown, to deliver a supply of fuel-air mixture. If desired, a jet system may be used for injecting the fuel mixture into the cylinder directly when the pistons and plates 56 are in proper positions.

The annular area between the spacer ring 18 of the housing 12 and the ring portion 38 of the rotor 32 is, in effect, a cylinder chamber, generally designated 108. The pistons 74 and 76 act as piston heads as they move through the chamber 108 and the plates 56 act as cylinder heads. The movement of the pistons 74 and 76 is clockwise and the clockwise movement is, therefore, considered a movement in the forward direction.

At the rear (referring to the clockwise direction) of each plate 56 is an opening 110 opening laterally into the chamber 108. These openings 110 are provided with pressure-relief check valves, not shown, and are connected to a storage tank or the like for receiving air under pressure exhausted from the openings 110. At the other (or forward) side of each plate 56 is a lateral opening 112 which is connected, by suitable cam-operated valving, not shown but common in the art, to a source from which it provides a combustible charge in the chamber 108. In approximately the same areas as the openings 112 are provided spark plugs 114, connected to the front plate 14.

The entire housing 12 is preferably provided with openings 116, these openings being arranged in the plates 14 and 16 and in the spacer ring 18, for the purpose of cooling the engine during its operation. The cooling air will pass through these openings 116 as the rotor rotates and, if desired, the movement of the air can be increased by using a blower or using the outlet end of the fan in the system as a blower.

In the operation of the engine, using Fig. 1 as an illustration, the pistons 74 are the power pistons and the pistons 76 are the scavenging or exhaust pistons. During the rotation of the rotor 32, the piston 74, as it moves from one plate 56 to the next, compresses the fuel-air mixture in the chamber 108 between its inclined forward face 78 and the side of the plate 56 toward which it is moving. As the piston 74 continues to move toward plate 56, it decreases the effective area of the chamber therebetween, forcing out the air in front of it through the opening 110, the air being placed under sufficient pressure by the piston to open the check valve.

While it continues to push the compressed fuel-air mixture in front of it, the piston 74 reaches the plate 56 and the inclined face 78 of the piston acts to gradually cam open the chamber by pushing the plate 56 upwardly against the force of its spring 64. The compressed fuel-air mixture is then pushed through valve 110 in the plate 16 which is closed again as soon as the abrupt face 82 on the rear of the piston has passed.

As the piston 74 moves past opening 112, the cam-operated mechanism, not shown, injects a combustible charge through opening 112 and the spark plug 114 fires to ignite the combustible charge and cause the fuel-air mixture to explode. The expanding gases resulting from the explosion push against the abrupt rear face 82 of the piston 74 and provide a power stroke of the engine.

As the piston 74 continues to advance leaving behind it the exhaust gases and fumes, the next succeeding piston 76 passes under the plate 56 in similar manner to piston 74 and enters the chamber portion in which the explosion has occurred. As it continues to advance through this chamber, the exhaust gases are scooped up by the leading, inclined face 80 of the piston 76 and are vented through the passage 90 and then through passage 94 to the exhaust manifold 98. This leaves a partial vacuum behind the piston 76 which acts to draw up into the chamber 108 a new mixture of fuel and air from the carburator. This mixture is drawn through the passage 100. In this manner, it is not necessary to use easily clogged valves for either the exhaust or for the fuel supply.

The fuel-air mixture drawn in through passage 100 is then in position to be compressed by the next succeeding piston 74. The cycle is then continuously repeated.

As can be seen, for each revolution of the rotor 32 there are provided six power strokes since each piston 74 passes three cylinder head plates 56 during each revolution. This is the equivalent of the power obtained in a four cycle, twelve cylinder engine having twelve pistons and twenty-four valves. Furthermore, the continuous rotation of the pistons makes it possible to have a long leverage on the engine shaft thereby giving at least three times the power as is usually obtained with the same amount of fuel. This permits the use of small, light engines where only large, bulky ones could be used heretofore. Furthermore, the complete and efficient scavenging of the exhaust gases by the pistons 76 increases the power output by leaving only combustible fuel mixtures in the explosion chambers; and this is accomplished without the use of any additional exhaust means requiring the utilization of additional energy.

In addition to the above, the air-circulating openings in the housing decrease the total weight of the engine while yet providing an effective cooling means, and the use of oil behind the sealing strips and rings provides an efficient and positive sealing and lubriction at the same time.

Although this invention has been described in considerable detail, such description is intended as being illustrative rather than limiting, since the invention may be variously embodied, and the scope of the invention is to be determined as claimed.

Having thus set forth and described the invention, what is claimed is:

An internal combustion engine comprising a cylindrical housing, a rotatable shaft extending axially through said housing, a rotor having passage means therein mounted on said shaft within said housing, said rotor having its outer periphery spaced from the inner periphery of the housing to form an annular combustion chamber therebetween, a first pair of pistons mounted on the periphery of said rotor and spaced about 180 degrees from each other, a second pair of pistons mounted on the periphery of said rotor and spaced about 180 degrees from each other, the pistons of said second pair being alternately arranged with the pistons of the first pair, each of said pistons being movable within said combustion chamber, each of said pistons having a gradually-inclined front face and a steep rear face with an apex portion between the two faces, the pistons of said first pair being solid, the pistons of said second pair having radial exhaust passage means therein which connect with said passage means within the rotor, said passage means in the rotor being, in turn, connected to an exhaust system, an inlet passage in said rotor rearwardly of each piston of said second pair, said inlet passages each opening onto the outer peripheral surface of the rotor at one end and being connected to a supply system at the other end, and three radially-movable abutment plates equidistantly spaced around the outer perimeter of said housing and movable radially within said combustion chamber, each of said abutment plates being resiliently urged toward said rotor and being adapted to be lifted away from said rotor by the camming action of said pistons, sealing strips positioned in recesses in said housing at each side of each abutment plate, an oil chamber in each recess behind the corresponding sealing strip, means to conduct oil to said oil chambers, a sealing strip provided around the sides and radially inner end of each abutment plate, a plurality of pistons having cam surfaces on the outer periphery of said rotor, an apex adjacent the cam surface on each piston, a sealing strip at each apex, sealing rings surrounding said rotor, said sealing rings being relatively loosely positioned in corresponding annular recesss in said housing, oil chambers in said annular recesses behind said sealing rings, and conduits for supplying oil under pressure, to said oil chambers, said relatively loose positioning of said rings permitting limited seepage of oil therepast.

References Cited in the file of this patent

UNITED STATES PATENTS

| | | |
|---|---|---|
| 1,145,627 | Stradovsky | July 6, 1915 |
| 1,177,162 | Zona | Mar. 28, 1916 |
| 1,235,786 | Fleming | Aug. 7, 1917 |
| 1,268,794 | Harris et al. | June 4, 1918 |
| 1,402,057 | Davis | Jan. 3, 1922 |
| 2,366,213 | Pover | Jan. 2, 1945 |
| 2,381,007 | Seyerle | Aug. 7, 1945 |
| 2,732,268 | Duval | Jan. 24, 1956 |

FOREIGN PATENTS

| | | |
|---|---|---|
| 386,356 | Germany | Dec. 8, 1923 |
| 953,027 | France | May 16, 1949 |